United States Patent [19]

Rise

[11] 4,403,538
[45] Sep. 13, 1983

[54] TURBOCHARGER CONTROL ACTUATOR

[75] Inventor: Leif Rise, Los Angeles, Calif.

[73] Assignee: The Garrett Corporation, Los Angeles, Calif.

[21] Appl. No.: 182,859

[22] Filed: Sep. 2, 1980

[51] Int. Cl.³ ............................................. F01B 19/00
[52] U.S. Cl. ........................................ 92/94; 60/602; 92/100; 92/167; 92/168
[58] Field of Search ................... 92/167, 168, 94, 100; 277/30; 60/602

[56] References Cited

U.S. PATENT DOCUMENTS

| 371,309 | 10/1887 | Falk | 277/30 |
|---|---|---|---|
| 373,072 | 11/1887 | Jarvis | 92/167 |
| 2,875,864 | 3/1959 | Kirk | 92/168 |
| 2,910,966 | 11/1959 | Bodem | 92/168 |
| 3,242,868 | 3/1966 | Gold | 92/168 |
| 3,279,327 | 10/1966 | French | 92/168 |
| 4,251,050 | 2/1981 | McInerney | 92/167 |
| 4,256,019 | 3/1981 | Braddick | 92/168 |

FOREIGN PATENT DOCUMENTS

| 1333774 | 5/1962 | France | 92/168 |
|---|---|---|---|
| 1535312 | 12/1978 | United Kingdom | 92/167 |

Primary Examiner—Abraham Hershkovitz
Attorney, Agent, or Firm—Stuart O. Lowry; James W. McFarland; Albert J. Miller

[57] ABSTRACT

A control actuator for a turbocharger comprises an actuator rod coupled within an actuator housing to a pressure responsive diaphragm biased by a spring, and projecting out of the housing for connection to a turbocharger wastegate valve. A seal assembly on the rod accommodates sealed axial rod displacement, and includes a spherical seat maintained by a second spring in relatively low pressure pivotally sealing relation with the housing.

5 Claims, 4 Drawing Figures

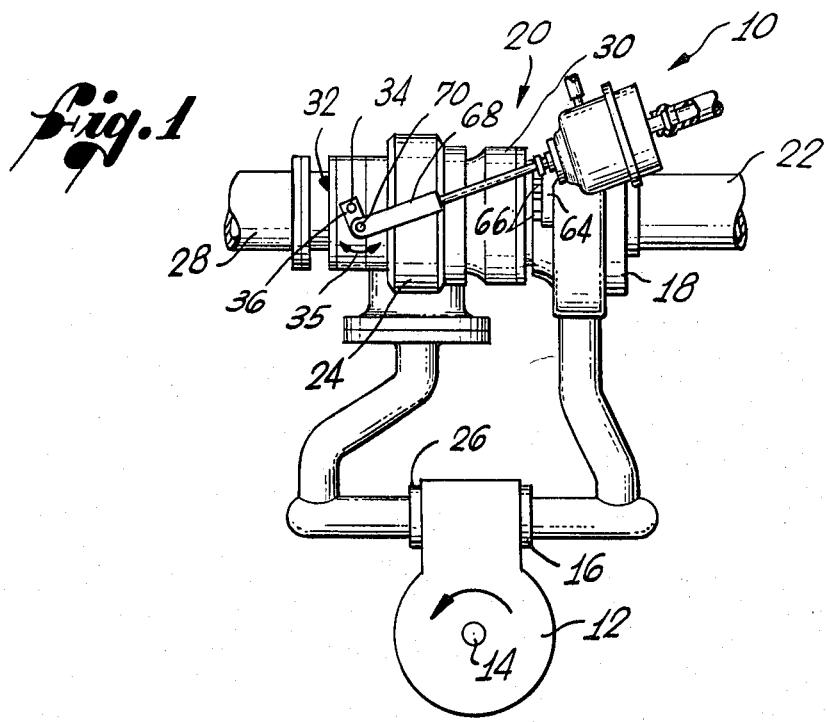
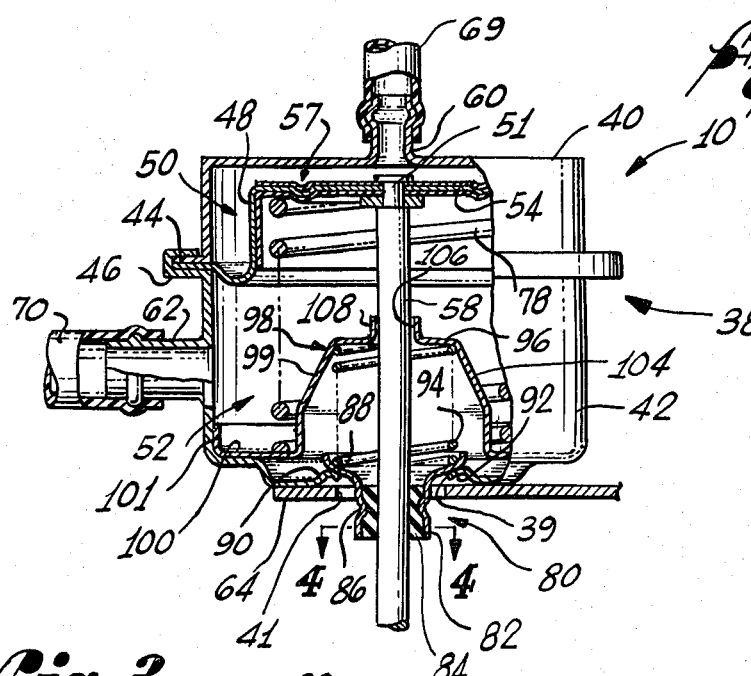
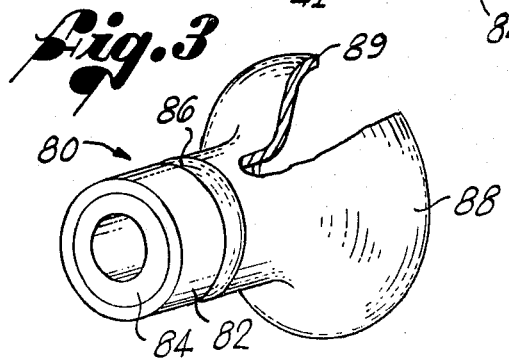
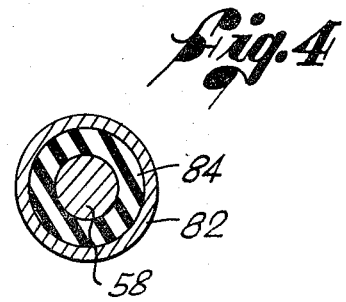

TURBOCHARGER CONTROL ACTUATOR

BACKGROUND OF THE INVENTION

This invention relates to turbochargers and control devices therefor. More specifically, this invention relates to an improved pressure-responsive actuator for controlling the operation of the turbocharger.

Turbochargers are well known in the art, and typically comprise a turbine for driving a compressor to supply relatively high pressure charge air to a combustion engine. The turbine is rotatably driven by exhaust gases from the engine, and in turn rotatably drives a compressor for compressing charge air supplied to the engine. An inherent design problem with turbochargers, however, is that the rotational speed of the turbine and compressor increases as the speed and/or load of the engine increases. At relatively high operating engine speeds or loads, it is possible for the turbine and compressor to be driven at speeds above critical design limits, or for the compressor to supply charge air to the engine at boost pressures higher than the engine can withstand.

A wide variety of control devices for turbochargers have been developed to limit the rotational speed of the turbocharger compressor and thereby to control the boost pressure level of the charge air supplied by the compressor. Such devices can be mounted either on the compressor or the turbine and commonly include blow-off or pop-off valves, turbine bypass or wastegate valves, compressor inlet control valves, and the like. These valve devices are generally similar to each other in principle in that each comprises a valve responsive to a predetermined pressure level or pressure differential to restrict the availability of gases for driving the turbine or for supply to the engine by the compressor. For example, a turbine wastegate valve operates to close a flow path bypassing the turbine and may be opened by a pressure-responsive valve actuator to allow a portion of the engine exhaust gases to bypass the turbine to atmosphere. In this manner, the turbine is rotatably driven by a relatively reduced mass flow of exhaust gases to limit the rotational speed of the turbine and thereby also to limit and control the rotational speed and resultant boost pressure of charge air supplied by the compressor.

Pressure responsive valve actuators typically comprise an actuator housing including a diaphragm which is biased by a relatively stiff spring and which divides the housing into a pair of separate pressure chambers. Inlet ports couple the two pressure chambers to different sources of pressure and/or vacuum to subject the diaphragm to a prescribed pressure differential. Changes in the pressure differential, such as may occur during increases or decreases in engine speed or load, cause displacement of the diaphragm which in turn displaces an actuator rod connected thereto. The rod projects out of the housing, and is connected to an appropriate valve assembly on the turbocharger for positioning a valve to control turbocharger operation.

In practice, one major consideration in the design of pressure-responsive valve actuators is to provide an adequate seal allowing passage of the actuator rod through the actuator housing without significant gas leakage. This is particularly important wherein the pressure sources coupled to the actuator housing comprise gaseous air-fuel mixtures or wherein the actuator housing is mounted in close association to hot engine components or the turbine of the turbocharger. In this regard, prior art seals which have satisfactorily prevented gas leakage typically have restricted displacement of the actuator rod to axial motion only. This type of seal finds its primary application wherein the actuator rod comprises a valve stem connected directly to or formed integrally with a valve head, and wherein axial rod motion is sufficient to properly position the valve head. See, for example, U.S. Pat. Nos. 3,035,408; 3,091,077; 3,104,520; 3,195,805; 3,196,606; 3,270,495; 3,389,553; 4,005,578; 4,005,579; 4,019,323; and 4,075,849, all of which relate to valve actuators with valve stems or rods limited to axial motion. However, it is sometimes desirable to use other types of valve structures, such as a relatively inexpensive butterfly valve or the like positionally adjusted by means of a crank arm. With these alternate valve structures, at least some arcuate motion of the actuator rod is required for adjusting the position of the valve. With prior art devices wherein the actuator rod is constrained for axial movement only, relatively complex and multiple-link mechanical couplings have been required between the rod and the valve structure for accommodating the desired arcuate movement. See for example, U.S. Pat. Nos. 2,356,124; 2,374,708; and 3,096,614.

Some attempts have been made to provide a relatively inexpensive seal for sealing passage of the actuator rod through a turbocharger actuator housing, while at the same time allowing for at least some arcuate actuator rod movement. However, these designs have related to various flexible or elastomeric seal arrangements, or alternately, to the use of seals formed from relatively exotic materials and have not proven totally satisfactory for long life operation in the high temperature vibratory environment of turbochargers. See, for example, copending U.S. Pat. No. 4,251,050 assigned to the same assignee herein. Other designs have proposed the use of spherically-shaped metal sealing members received about the rod and maintained in pivotally sealing engagement with the housing by the relatively stiff spring used for biasing the actuator diaphragm. See, for example, copending U.S. Pat. No. 4,256,019 assigned to the same assignee herein. However, in some applications, the force applied by the stiff spring upon the sealing member is sufficient to prevent free angular displacement of the actuator rod and the sealing member, thereby resulting in binding and undue wear of the components and in relatively slow response to changing pressure differentials.

The present invention overcomes the problems and disadvantages of the prior art by providing an improved turbocharger control actuator having an actuator rod projecting outwardly from an actuator housing and including improved means for sealing passage of the actuator rod through the housing to allow relatively free axial and angular movement of the actuator rod with respect to the housing.

SUMMARY OF THE INVENTION

In accordance with the invention, a turbocharger control actuator comprises an actuator housing with an internal diaphragm dividing the housing into a pair of separate pressure chambers. The diaphragm is connected to an actuator rod projecting through one of the chambers and outwardly from the housing for connection to a turbocharger control valve, such as a turbine wastegate valve. The diaphragm and the rod displace in response to variations in pressure differential applied to the diaphragm via ports opening into the pressure chambers for connection of said chambers to a selected pair of pressure sources. A relatively stiff control spring reacts between the housing and the diaphragm for biasing the diaphragm against pressure responsive movement until a predetermined pressure differential threshold is reached.

An annular seal assembly is received about the actuator rod and coacts with the housing and the rod for sealing passage of the rod through an opening formed in the actuator housing. More specifically, the seal assembly includes a seal member having a lower cylindrical portion having an annular bushing secured therein which sealingly receives the actuator rod for axial rod displacement. This cylindrical portion blends upwardly into a generally cup-shaped portion opening into the housing and defining a spherical or bulbular-shaped sealing seat disposed generally within the opening formed in the actuator housing, and sealingly seated upon a matingly configured sealing surface formed by the housing.

A relatively resilient spring has one end received within the cup-shaped portion of the seal member and its opposite end reacting against a retainer wall fixed with respect to the actuator housing. In this manner, the resilient spring maintains the sealing seat of the seal member under relatively light pressure in pivotally sealing relation with the housing sealing surface, whereby the seal member accommodates angular displacement of the actuator rod independently of the biasing force applied to the diaphragm by the control spring.

Other features and advantages of the present invention will become apparent from the following detailed description, taken in conjunction with the accompanying drawings, which illustrate by way of example the principles of the invention.

BRIEF DESCRIPTION OF THE DRAWINGS

The accompanying drawings illustrate the invention. In such drawings:

FIG. 1 is a schematic illustration of a control actuator of this invention mounted on a turbocharged combustion engine;

FIG. 2 is an enlarged fragmented elevation view of the control actuator, with portions broken away;

FIG. 3 is a perspective view of a sealing member for use with the control actuator; and FIG. 4 is an enlarged horizontal section taken on the line 4—4 of FIG. 2.

DETAILED DESCRIPTION OF THE PREFERRED EMBODIMENT

A control actuator 10 of this invention is shown in FIG. 1 mounted on a turbocharged combustion engine 12. The engine 12 is generally conventional in form and may comprise any of a wide variety of combustion engines, such as a reciprocating engine of the type used for automotive vehicles having a driven crankshaft 14 for power output. Intake charge air for the engine 12 is supplied through an intake manifold 16 from a compressor 18 of a turbocharger 20. The compressor 18 draws ambient air through an inlet 22 and compresses the air for supply to the engine. Exhaust gases expelled by the engine are drivingly coupled to a turbine 24 of the turbocharger 20 via an exhaust manifold 26 and are discharged from the turbine 24 through an exhaust conduit 28. In operation, the engine exhaust gases rotatably drive the turbine 24 which, in turn, drives the compressor 18 via a shaft (not shown) carried in an interconnecting center housing 30.

In many turbocharged engines, it is possible for the turbocharger 20 to operate at rotational speeds higher than the turbocharger mechanical components can withstand or to supply compressed charge air to the engine at boost pressures higher than the engine can withstand. Specifically, at relatively high operating speeds or loads, the mass flow rate of exhaust gases is sufficient to drive the turbine 24 at a rotational speed exceeding turbocharger or engine critical design limits. To prevent damage to the system, as well as to provide system control, control means are provided for preventing the rotational speed of the turbine and the compressor from exceeding a predetermined level, thereby limiting or controlling the compressor boost pressure.

As shown in FIG. 1, one such control means comprises a wastegate valve assembly 32 mounted on the turbine 24 and including a pivot pin 34 extending outwardly from the turbine 24 and connected to a crank arm 36. Movement of the crank arm 36 through an arcuate path, illustrated by arrow 35, with respect to the axis of the pivot pin 34 serves to move an internally mounted wastegate valve (not shown), such as a butterfly or flap valve, to open and close a turbine bypass passage (also not shown). More specifically, the wastegate valve is disposed along an internal bypass passage communicating directly between the exhaust manifold 26 and the exhaust conduit 28 so that a portion of the engine exhaust gas bypasses the rotating turbine when the valve is opened, consequently to control turbocharger rotational speed and boost. Importantly, the specific construction of the turbine 24, including the valve assembly 32 and the bypass passage, is generally well known in the art and therefore is not shown or described in detail. However, for a specific example of a representative turbocharger including the turbine, valve assembly, and bypass passage, see U.S. Pat. No. 4,120,156, assigned to the assignee of the present application and incorporated by reference herein.

The control actuator 10 of this invention is shown in more detail in FIGS. 2-4. As shown, the actuator 10 comprises a generally cylindrical metal housing 38 formed from complementary upper and lower halves 40 and 42, respectively. The housing halves 40 and 42 are each generally circular in cross section and include radially outwardly extending flanges 44 and 46, respectively. A circular diaphragm 48, formed from a suitable flexible elastomeric or rubber-based material, extends across the housing 38 to divide the housing into two separate chambers 50 and 52. The periphery of the diaphragm is received between the flanges 44 and 46 and is secured in place as by means of the lower flange 46 rolled over the upper outer edge of the upper flange 44.

The diaphragm 48 comprises a preformed or convoluted diaphragm captured between a cup-shaped piston member 54, positioned within the lower housing chamber 52, and a central stiffener plate 55 positioned within the upper housing chamber 50. As shown, the piston member 54 and the plate 55 both have a diameter less than that of the housing 38 and the diaphragm 48 so as not to interfere with movement of the diaphragm in response to relative pressures in the chambers 50 and 52. The piston member 54 and the plate 55 are connected together through the diaphragm 48 by a central pin 51 and may conveniently include aligned dimples, as at 57, for securely locating the diaphragm 48 therebetween.

An actuator rod 58 is connected preferably by means of the pin 51 to the lower face of the piston member 54, as viewed in FIG. 2. The actuator rod 58 extends downwardly from the piston member 54 through the chamber 52 and outwardly from the housing 38 through an opening 39. The lower end of the rod 58 extends further through an opening 41 in a bracket 64 mounted on the housing as by welding to provide structure for connection of the actuator 10 to the turbocharger 20 by bolts 66 (FIG. 1). The lowermost end of the rod 58 is threadably received in a rod extension 68 which, in turn, is pivotally connected to the end of the valve assembly crank arm 36 by a pin 70. Accordingly, pressure responsive movement of the diaphragm 48 within the housing 38 displaces the rod 58 to swing the crank arm 36 about the axis of the pin 34, thereby opening or closing the control valve (not shown) within the turbine 24. Importantly, the crank arm 36 swings through the arcuate path illustrated by arrow 35 in FIG. 1, whereby the actuator rod 58 must be free to move axially and slightly angularly with respect to the housing 38. Of course, suitable alternate connecting schemes for connecting the actuator rod 58 to the valve assembly 32 may be employed, if desired.

Control pressures are supplied to the upper and lower housing chambers 50 and 52, respectively, for applying a controlled pressure differential across the diaphragm 48 to effect movement of the diaphragm and the actuator rod in response to the pressure differential. More specifically, a port 60 is provided in the upper housing half 40 for opening into the upper chamber 50, and a port 62 is provided in the lower housing half 42 for opening into the lower chamber 52. The ports 60 and 62 are respectively coupled to the ends of tubing 69 and 70 for communication of prescribed control pressures to the respective chambers. For example, in one common control scheme for turbocharger control actuators, compressor discharge pressure is communicated to the upper chamber 50, and compressor intake pressure is communicated to the lower chamber 52 to result in a pressure differential tending to move the diaphragm 48 and the actuator rod 58 downwardly for opening a wastegate valve. However, a variety of other control pressure differentials may be used depending upon the specific application. In any event, a relatively stiff compression spring 78 is normally provided for reacting within the lower chamber 52 between the lower housing half 42 and the underside of the piston member 54 for biasing the diaphragm upwardly within the housing. In this manner, the spring 78 provides a threshold force to the diaphragm 48 which must be exceeded by the pressure differential before the diaphragm and the rod will respond to shift the position of the wastegate valve.

As shown in FIGS. 2-4, a seal assembly 80 is provided for sealing passage of the actuator rod 58 through the opening 39 in the housing 38, while at the same time accommodating axial and angular displacement of the rod with respect to the housing. More specifically, the seal assembly 80 includes a generally annular-shaped seal member formed from a relatively rigid material such as stainless steel. The seal member is formed to have a lower cylindrical portion 82 concentrically received about the actuator rod 58 adjacent the housing opening 39. This lower cylindrical portion 82 is sized for reception of a cylindrical bushing 84 concentrically between the rod 58 and the cylindrical portion 82. This bushing 84 is formed from a high quality seal material, such as a graphite-impregnated Teflon, and allows relatively free and sealed axial sliding movement of the rod 58 with respect thereto. Importantly, the cylindrical portion 82 and the bushing 84 include aligned annular grooves, as at 86, for axially securing the components with respect to each other. Alternately, other connecting means can be used, such as a staked connection or the like.

The lower cylindrical portion 82 of the seal member blends upwardly into a generally cup-shaped portion 88 positioned generally within the housing opening 39 and opening into the lower chamber 52 of the housing 48 in a direction facing toward the diaphragm. This cup-shaped portion 88 is shaped to define a downwardly presented, annular sealing seat 90 comprising an annular portion of a spherical surface. This spherically-shaped sealing seat 90 is presented downwardly in alignment with a complementary-shaped sealing surface 92 formed by the portion of the lower housing half 42 surrounding the housing opening 39. Accordingly, the sealing seat 90 of the seal assembly 80 matingly and sealingly engages the sealing surface 92 of the housing to define a pivotally movable sealed interface, which accommodates angular deviations of the actuator rod 58.

A compression spring 94 is provided for maintaining the seat 90 of the seal member in pivotally sealing engagement with the housing sealing surface 92. According to the present invention, this spring 94 is separate and independent from the control spring 78 and comprises a relatively flexible or resilient spring for application of a relatively low sealing force to the seal member. As illustrated, the opposite ends of this spring 94 react between the cup-shaped portion 88 of the seal member and a retainer wall 96 which is secured in a position concentrically about the actuator rod 58, generally midway between the seal member and the diaphragm 48. Conveniently, the cup-shaped portion 88 includes an upstanding peripheral rim 89 for radially containing and positioning the adjacent end of the spring 94.

The retainer wall 96 comprises the upper, generally circular-shaped surface of a cup-shaped retainer 98 disposed in an inverted position within the lower chamber 52 of the actuator. More specifically, this retainer 98 includes a cylindrical side wall 99 extending downwardly from the retainer wall 96 to a position in engagement with the lower housing half 42 circumferentially about the housing opening 39 and the housing sealing surface 92. This side wall 99 merges with a radially outwardly projecting flange 100 which is sized and shaped for relatively snug bearing engagement with the lower surface of the housing half 42. If desired, the flange 100 can include an upturned peripheral rim 101 for improving the snug engagement with the lower housing half 42.

The flange 100 of the retainer 98 is secured in bearing engagement with the lower housing half 42 in order to fix the position of the retainer wall 96 within the actuator. As illustrated, this can be accomplished by positioning the actuator control spring 78 to react between the diaphragm 48 and the retainer flange 100. Since the control spring 78 is substantially stronger than the smaller compression spring 94, the control spring 78 serves to anchor the retainer securely within the lower housing chamber 52. Alternately, if desired, the flange 100 can be welded directly to the lower housing half 42 of the actuator.

The compression spring 94 thus reacts independently of the control spring 78 to apply a relatively light sealing force to the seal member to maintain the sealing seat 90 and the housing sealing surface 92 in pivotally sealing engagement with each other. This accommodates angular deviations of the actuator rod 58 which normally occur as the rod swings through the relatively slight arcuate path required to control the position of the wastegate valve. Importantly, this pivoting, sealing movement takes place with relatively low friction as a result of the relatively low pressure applied by the spring 94. Moreover, during operation, the length of the spring 94 remains substantially constant by virtue of the fixed position of the retainer wall 96 within the housing. Conveniently, the upper portion of the retainer side wall 99 is angled radially inwardly toward the upper retainer wall 96 to form an annular corner 104 for capturing and radially retaining the adjacent end of the spring 94.

The retainer wall 96 also includes a central opening 106 sized for relatively loose clearance passage of the rod 58 so as to accommodate the necessary angular rod motion during operation. However, the opening 106 is sized to prevent substantial excess angular rod deviation, such as can occur during or prior to installation on an engine or upon failure of components, which could otherwise damage the pressure responsive diaphragm 48. Moreover, as shown in FIG. 2, the wall 96 desirably includes an upturned sleeve portion 108 projecting axially with respect to the rod 58 toward the underside of the piston member 54. This sleeve portion 108 is chosen to have an axial length to provide a limiting stop defining the maximum allowable axial displacement of the rod 58 and the diaphragm 48.

The control actuator of this invention may include a wide variety of modifications and improvements within the scope of the invention. For example, the valve assembly 32 may comprise any of a wide variety of valve assemblies including wastegate, blow-off, and pop-off valves or the like. Accordingly, no limitation on the invention set forth herein is intended, except by way of the appended claims.

What is claimed is:

1. A turbocharger control actuator comprising a housing; a diaphragm dividing said housing into a pair of chambers; an actuator rod having one end coupled to said diaphragm for movement therewith and extending therefrom out of said housing through an opening formed in said housing; a relatively stiff spring for predeterminably biasing said diaphragm; a seal member including a lower cylindrical portion concentrically received about said rod and a generally cup-shaped upper portion defining a sealing seat formed generally as a portion of a spherical surface in pivotally bearing engagement with said housing adjacent said opening, said housing including a housing lip formed concentrically about said opening and configured for mating engagement with said sealing seat; retainer means comprising a generally cup-shaped inverted retainer received within said housing about said rod and including a retainer wall disposed generally between said seal member and said diaphragm and having a passage formed therein for passage of said rod to accommodate limited angular rod displacement, said retainer means further including a generally cylindrical side wall projecting downwardly from said retainer wall for engagement with said housing circumferentially about said housing lip, and a flange projecting radially outwardly from the lower end of said side wall for bearing engagement with said housing, said relatively stiff spring reacting between said diaphragm and said flange for maintaining said flange in bearing engagement with said housing; a relatively flexible spring reacting between said retainer wall and said seal member for urging said sealing seat into pivotally sealing engagement with said housing to maintain said seal member and housing in pivotally sealing relation; and bushing means concentrically secured within said cylindrical portion of said seal member and slidably received about said rod for maintaining said seal member and said rod in axially sliding sealing relation.

2. A turborcharger control actuator as set forth in claim 1 including means for subjecting said diaphragm to a selected pressure differential for movement of said diaphragm and said rod in response thereto.

3. A turbocharger control actuator as set forth in claim 1 wherein said retainer wall includes an annular sleeve portion about said rod and projecting toward said diaphragm.

4. A turbocharger control actuator as set forth in claim 1 wherein the upper portion of said side wall is angled radially inwardly toward said retainer wall to define an annular corner sized for retention of the adjacent end of said relatively flexible spring.

5. A turbocharger control actuator as set forth in claim 1 wherein said cup-shaped portion of said seal member includes a peripheral rim projecting generally toward said retainer wall and sized for retention of the adjacent end of said relatively flexible spring.

* * * * *